UNITED STATES PATENT OFFICE.

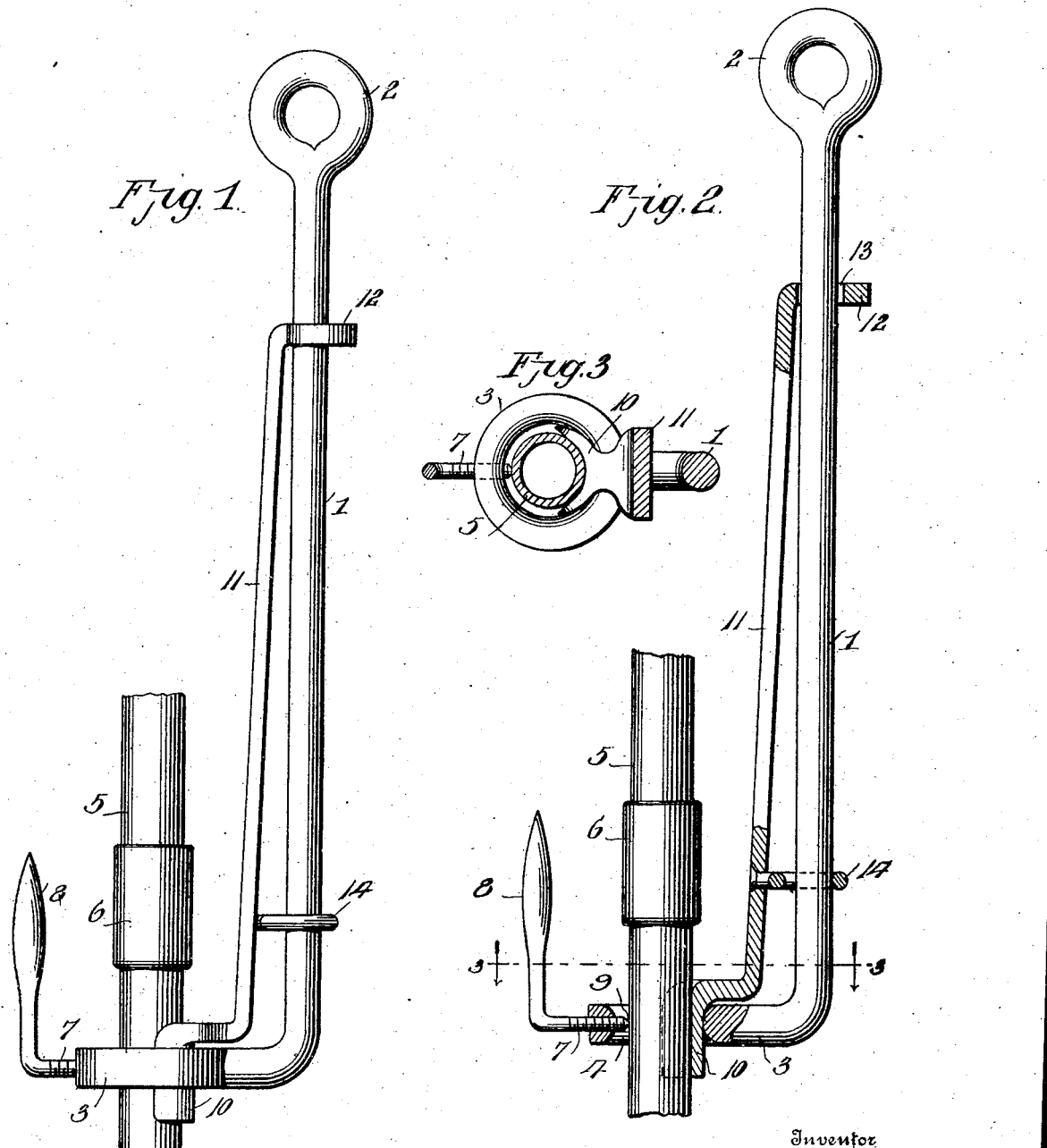

JOSEPH B. DANFORTH, OF GOLIAD, TEXAS.

CLAMP.

No. 849,980.	Specification of Letters Patent.	Patented April 9, 1907.

Application filed January 19, 1907. Serial No. 353,161.

*To all whom it may concern:*

Be it known that I, JOSEPH B. DANFORTH, a citizen of the United States, residing at Goliad, in the county of Goliad and State of Texas, have invented new and useful Improvements in Clamps, of which the following is a specification.

This invention relates to clamps adapted for use in connection with a hoisting-tackle for raising or lowering well-pipes, and has for its objects to provide a comparatively simple inexpensive device of this character which may be readily and securely engaged with the pipe, one which will retain a firm grip on the pipe during manipulation of the latter, and one which may be conveniently released when circumstances require.

With these and other objects in view the invention comprises the novel features of construction and combination of parts more fully hereinafter described.

In the accompanying drawings, Figure 1 is a side elevation of a clamp embodying the invention. Fig. 2 is a similar view, partly in section, the section being taken centrally and longitudinally through the pipe-receiving head and auxiliary clamping member. Fig. 3 is a detail sectional view taken on the line 3 3 of Fig. 2.

Referring to the drawings, it will be seen that the body of the device comprises a member or rod 1, provided at its upper end with an eye 2 and at its lower end with a right-angularly-disposed annular head 3, presenting an opening 4, adapted to receive the well-tube 5, which includes a coupling-sleeve 6.

Threaded through the front wall of the head 3 is a clamping member or screw 7, provided with an operating-handle 8 and having a sharpened bearing end 9, which may be chilled or otherwise hardened, there being employed in connection with the clamp 7 and for holding the pipe in the opening 4 an auxiliary clamping member 10 in the form of a substantially semicircular wedge adapted to enter the opening and formed on the lower end of a bar-metal stem or shank 11, provided at its upper end with an overturned bearing-ear 12, having an opening 13 to receive the rod 1, there being riveted or otherwise attached to the shank 11 at a point adjacent its lower end a metal bearing-ring or eye 14, through which the rod 1 is extended.

It will be observed in this connection that the bearings 12 and 14 serve as guides for and during relative movement of the parts 1 and 11, and, further, that the bearing 14 is of a size relative to the eye 13 to permit the member 10 to follow an oblique path of movement when entered into the opening 4, for a purpose which will presently appear.

In practice the primary clamping member is unscrewed and the auxiliary clamp 10 withdrawn from the opening 4 to permit of the pipe 5 being arranged in the latter, after which the clamping member 10 is first introduced to bear at one side of the pipe and the clamping member finally set up by means of the handle 8 for coöperation with the clamp 10 to hold the device in secure engagement with the pipe. The tackle-block hook is then engaged with the eye 2 to effect connection of the device with the tackle during the operation of raising or lowering the pipe from or into the well, it being observed that owing to the device being suspended from the tackle-block hook, which is swiveled in the block, as usual, the device, together with the pipe, may turn freely. In the event of the clamping-screw 7 breaking or becoming loosened the member 10 will serve to reduce the size of the opening 4 sufficiently to prevent the coupling-sleeve 6 from passing therethrough, it being understood, however, that when the device is to be released from the pipe the clamp 7 is unscrewed and the clamp 10 withdrawn from the opening 10, and, further, that owing to the clamp 10 having an oblique path of movement it will when entered into the opening exert a slight wedging action on the pipe for holding the same in secure engagement with the point of the clamping member 7.

Having thus described my invention, what I claim is—

1. In a device of the class described, a rod provided with a perpendicularly-disposed head having a pipe-receiving opening, a primary clamping member adjustably entered through one wall of the head and to project into the opening, and an auxiliary clamping member slidably connected with the rod and adapted for entrance into said opening at a point opposite the first-named clamp.

2. In a device of the class described, a rod provided with a perpendicularly-disposed head having a pipe-receiving opening, a clamping-screw threaded through one wall of the head for entrance into said opening, and an auxiliary clamping member adapted for entrance into the opening at a point opposite said screw, said auxiliary clamp having a stem slidably connected with the rod.

In testimony whereof I affix my signature in presence of two witnesses.

JOSEPH B. DANFORTH.

Witnesses:
R. P. APPLEBY,
M. L. BURNS.